June 14, 1932. W. S. SMITH ET AL 1,862,947
MANUFACTURE OF ARTICLES FROM THERMOPLASTIC MATERIALS
Filed May 10, 1930
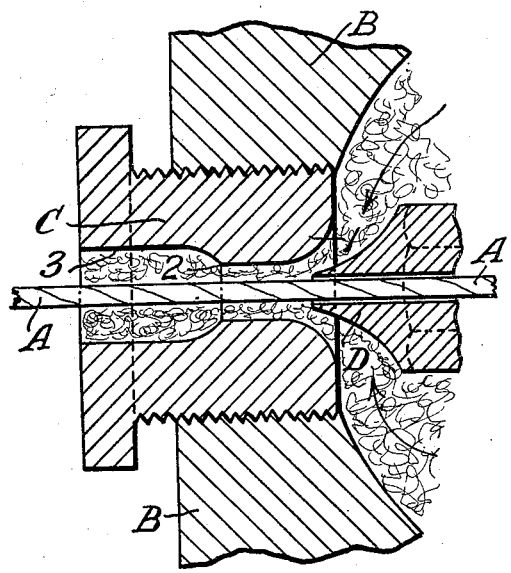
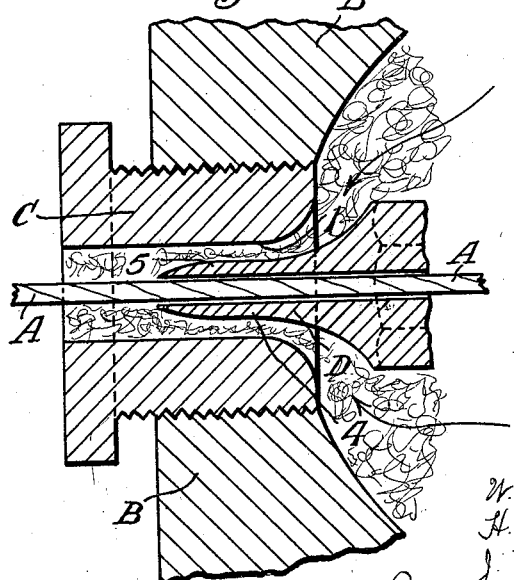
Inventors
W. S. Smith,
H. J. Garnett, &
J. H. Dean
By their attorneys,
Baldwin Wight Patented June 14, 1932

1,862,947

UNITED STATES PATENT OFFICE

WILLOUGHBY STATHAM SMITH, OF NEWTON POPPLEFORD, HENRY JOSEPH GARNETT, OF SOLEFIELDS, SEVEN OAKS, AND JOHN NORMAN DEAN, OF ORPINGTON, ENGLAND

MANUFACTURE OF ARTICLES FROM THERMOPLASTIC MATERIALS

Application filed May 10, 1930, Serial No. 451,492, and in Great Britain May 16, 1929.

This invention relates to improvements in the manufacture of electrical conductors insulated with thermoplastic materials, such as gutta percha, balata and the like, or natural or artificial substitutes therefor and mixtures thereof, which materials are applied to the conductor by a process of extrusion. The invention is particularly applicable to the manufacture of submarine or other signalling cables.

Hitherto, in the manufacture of insulated electrical conductors by the process of extrusion, the conductor was led through a vessel containing the thermoplastic material, e. g. gutta percha under pressure, and out through a die of approximately the same diameter as that desired for the finished core. Gutta percha was supplied to the vessel at such a rate that, as the conductor moved forward continuously at a certain speed dependent upon the pressure of feed of the gutta percha, a uniform covering of gutta percha was forced through the die around the conductor, the size of the coating being proportionate to the diameter of the die so that the cross section of the coated conductor was substantially the same as that of the die. The covered conductor was then cooled e. g. by passing it through cold water, until the gutta percha had set, when the conductor was generally coiled on to a drum to await testing or further treatment.

Now it has been found that thermoplastic material extruded by the method just described and then allowed to solidify, is in a state of strain. For instance, if a piece of the insulated conductor is heated to the softening point of the insulating material it will be observed that the gutta percha shrinks, leaving a length of the conductor bare at each end.

The main object of the present invention is the manufacture of an electric conductor, particularly a submarine signalling cable insulated with a thermoplastic material applied by a process of extrusion whereby the strain in the set extruded material is reduced, and by means of which also the extruded material is more homogeneous and the cohesion between its particles is increased.

According to the present invention, in order to remove the strain in the insulation, the feed pressure of the gutta percha or like thermoplastic material is increased and the speed of travel of the haul-off of the conductor is so controlled that the extruded insulation on the conductor has a cross-section greater than that of the die through which it is extruded.

The cross section of the gutta percha coating extruded on to the conductor is increased to a predetermined maximum dependent upon the amount of insulation required and preferably the amount of expansion is not less than 50%. It is thus possible to obtain a conductor insulated with a uniform coating of gutta percha, this coating however being considerably thicker than that normally applied by means of the particular die. Thus in order to manufacture by the method of this invention, a conductor insulated with a given weight of gutta percha per unit length, it is necessary to use a die having a considerably smaller diameter than has been used hitherto for the manufacture of such a conductor and to control the exact thickness of the coating by adjusting the pressure acting upon the gutta percha and/or the speed of forward travel of the conductor.

It will be understood that the invention may be carried out in the ordinary extrusion machine by substituting a smaller die for that previously used and by increasing the pressure under which the gutta percha is forced through the die. It may, however, be found that the gutta percha is not extruded uniformly round the die, but is, for instance, forced through more easily on one side than on the other.

To obviate this difficulty according to a further feature of the invention, the extrusion die is formed with a shaping portion or otherwise adapted to exert a gentle pressure on the extruded material, while the cross-section of the latter is increasing. In some cases a separate shaping die may be provided, through which the extruded article is passed after leaving the extrusion die.

In some cases it may be desirable to pass the extruded article, after expansion has ceased, through a second shaping or cutting die to give the article the desired cross-section.

The invention is illustrated in the accompanying drawing in which Figures 1 and 2 are part sectional elevations of two constructions of extrusion machines suitable for use in applying insulation to the core of a submarine cable.

In the drawing A indicates the conductor and B the outer wall of the container or body of the extrusion machine in which is detachably screwed a die C. D is the usual centre pin which has a central bore for the passage of the conductor. The gutta percha or other material to be extruded is contained under pressure within the container B and flows forwardly as indicated by the arrows on to the conductor A which is hauled off on to a drum (not shown) after passage if necessary, through a cooling bath, in the usual manner.

Referring now to Figure 1 the die C, in addition to the usual neck or extrusion portion 1, terminates in a shoulder 2, from which point the cross-section increases until it becomes once again a constant equal to the normal diameter or size of the insulated conductor. This latter portion 3 of the die constitutes the shaping portion, and while, in the die illustrated, it is formed in one with the extrusion portion, two separate dies could be provided, the comparatively narrower extrusion die being the first die and screwed as shown into the container wall B, and the shaping die then screwed on to or upon the extrusion die. As shown in Figure 1, after the insulating material passes through the extrusion portion 1 of the die it will expand radially as it passes from the shoulder 2 out through the shaping portion 3 so that the covering will be of greater diameter than the extrusion aperture.

Referring now to Figure 2, the centre pin is provided with an extension 4, extending into the neck 1 of the die and which pin at its tip has a taper starting from the point 5. From the point 5 the pin functions as a shaping die and is equivalent in its action to the die shown in Figure 1. As explained in connection with Figure 1, the material passing through the neck 1 of the die shown in Figure 2 will expand as it passes to the left of the tapered end 5 of the center pin. As shown in Figure 2, the covering is of greater cross sectional area than the cross sectional area of the extrusion aperture.

When a piece of the insulated conductor manufactured by the method just described is heated to the softening point of the gutta percha or other insulating material, it will be observed that the shrinkage of the gutta percha is much less than is the case for an exactly similar piece of insulated conductor prepared by the usual method of extrusion, showing that less strain is set up in the insulating material.

It is also found that, as a result of the expansion of the thermoplastic material after passing through the die, the material is more homogeneous and its cohesion is increased. This result, and the reduction of the strain in the material, are of great value in the manufacture of the insulated cores of submarine signalling cables, as the risk of faults is thereby reduced.

Further, as a result of the improved process, the material is obtained in a state of greater stability and its properties are therefore less likely to change with the passage of time.

The following example shows the reduction in the strain in the set material when the latter is extruded by the method in accordance with the invention.

A length of copper conductor was covered with gutta percha by the usual method by extruding the gutta percha through a die 0.164″ in diameter, whereby a coating having an external diameter when set of 0.162″ was obtained upon the copper. A length of the same copper conductor was also covered with the same gutta percha by the method in accordance with the invention by extruding the gutta percha through a die 0.125″ in diameter, the pressure acting on the gutta percha and the speed of forward travel of the conductor being adjusted so that a coating having an external diameter, when set of 0.169″ was obtained upon the copper. The copper conductor was removed from approximately equal short lengths of these two insulated conductors and, after corresponding lengths of copper conductor of slightly smaller diameter, sufficient to allow free sliding movement of the coating over the conductor has been passed through the hole to prevent the insulating material curving, the two pieces of material were heated carefully to the softening point of the gutta percha. When contraction had ceased, the pieces were allowed to cool and the change in length determined.

The results are given in the following table:—

| | Diameter of copper wire | Diameter of die | Outside diameter of gutta percha covering | Expansion at exit from die | Reduction in length on heating to 60° C. for 15 mins. |
|---|---|---|---|---|---|
| | Inch | Inch | Inch | Per cent | Per cent |
| 1. Gutta percha applied by the new method | 0.0515 | 0.125 | 0.169 | 60 | 5 |
| 2. Gutta percha applied by the old method | 0.0515 | 0.164 | 0.162 | −2.2 | 35 |

It is not possible to prescribe definite pressures and rates of haul-off, such as would be generally applicable for producing the requisite expansion at the exit from the die, because, apart from the practical difficulties of measuring pressures in a machine working on a plastic substance like gutta percha, which pressures may vary at different points, the required pressure for a specified rate of haul-off will depend on the grade or character of the material, the temperature, and so forth. The correct conditions regarding pressure and rate of haul-off for producing a desired result are best determined by experiment. It is possible, however, to indicate by rough figures the comparative pressures and rates of haul-off applicable to the Examples 1 and 2 of the tabulated results given above. Thus Example 1, working according to the new method, would be carried out with a pressure of about 1400 pounds per square inch and a rate of haul-off of 15 feet per minute, whilst Example 2, working according to the method, would be carried out with a pressure of about 1100 pounds per square inch, and a rate of haul-off of 21 feet per minute. As stated above, these figures must be interpreted from a comparative, rather than an absolute, point of view, and, moreover, like results could be produced by employing in Example 1 the same rate of haul-off employed in Example 2, i. e. 21 feet per minute, but raising the pressure in Example 1 still higher. Alternatively a still further reduction of rate of haul-off, i. e. below fifteen feet per minute, could be used in Example 1 with a lower pressure than 1400 pounds per square inch.

The degree of expansion required to produce a strain free core will depend upon the following factors:—(a) the size of the core; (b) the plasticity of the gutta percha at (c) the temperature of covering; and (d) the speed of covering.

It is interesting to note that if the gutta percha is applied to the copper wire in such a way that, instead of the cross section of the covered conductor being greater than that of the die, it is considerably less, there is an even greater reduction in length on heating to the softening point, indicative of a still greater strain in the set extruded material.

For example, a length of copper wire having the same diameter of 0.0515″ was covered by extruding the gutta percha through a die 0.184″, but the pressure acting on the gutta percha and the speed of forward travel of the conductor were adjusted so that the outside diameter of the gutta percha covering was 0.165″, representing a "contraction" of 14.5%. When a short length of this extruded gutta percha was tested in the way described above by heating it to 60° C. for 15 minutes, a reduction in length of 54% was observed.

In the accompanying claims it is to be understood that the term "gutta percha" is to be read to include all similar thermoplastic materials, e. g. balata and other natural or artificial substitutes therefor and mixtures thereof.

What we claim is:—

1. The method of removing strain in the applied gutta percha or like thermoplastic insulation of an electrical conductor which comprises extruding the gutta percha under such pressure and so controlling the rate of travel of the conductor that the gutta percha extruded upon the conductor is of a materially greater cross-section than that of the most constricted portion of the extruding die.

2. The method of removing strain in the applied gutta percha or like thermoplastic insulation of an electrical conductor which comprises extruding the gutta percha under such pressure and so controlling the rate of travel of the conductor that the gutta percha extruded upon the conductor is of a materially greater cross section than that of the die and in applying shaping pressure to the insulated conductor as it emerges from the constricted portion of the extruding die.

3. A method as claimed in claim 1, in which the pressure of extrusion and the rate of travel of the haul-off is such that the expansion at the mouth of the extrusion die is not less than 30%, substantially as described.

4. A method as claimed in claim 1, in which the pressure of extrusion and the rate of travel of the haul-off is such that the expansion at the restricted portion of the die is at least substantially 50%, substantially as described.

5. The method of applying substantially strainless thermoplastic insulation to an electrical conductor consisting in extruding the insulation through a die having an enlargement beyond a constricted portion, under such pressure and rate of travel that the extruded insulation will fill and be confined by the enlargement, whereby it has a materially greater cross section than the constricted portion of the die.

In testimony that we claim the foregoing as our invention we have signed our names this thirtieth day of April, 1930.

WILLOUGHBY STATHAM SMITH.
HENRY JOSEPH GARNETT.
JOHN NORMAN DEAN.